Jan. 14, 1936.   R. P. LANSING   2,027,832
CLUTCH OPERATING MEANS
Filed Nov. 10, 1931
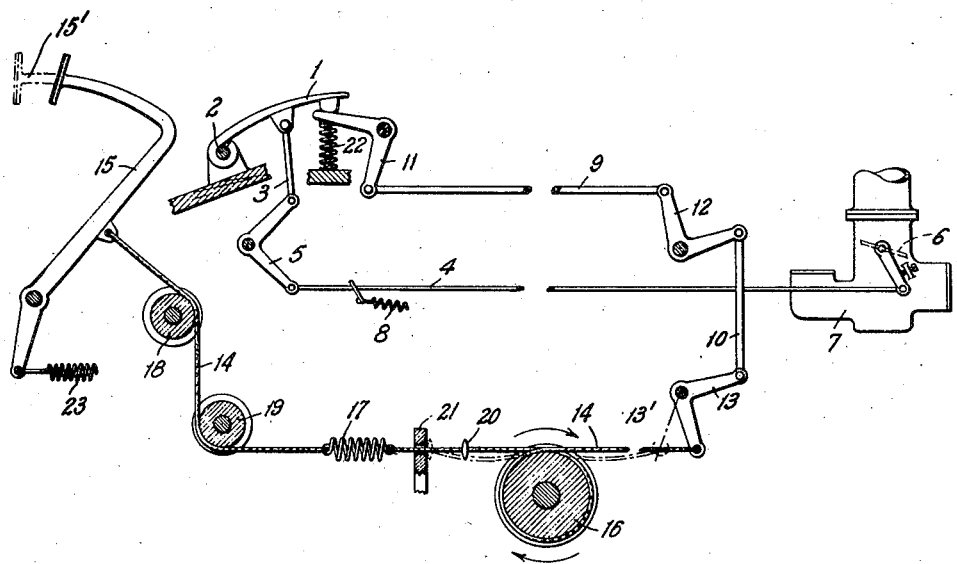
INVENTOR.
Raymond P. Lansing
BY Warren P. Hunt
ATTORNEY.

Patented Jan. 14, 1936

2,027,832

UNITED STATES PATENT OFFICE 2,027,832

CLUTCH OPERATING MEANS

Raymond P. Lansing, Montclair, N. J., assignor, by mesne assignments, to Eclipse Aviation Corporation, East Orange, N. J., a corporation of New Jersey Application November 10, 1931, Serial No. 574,169

15 Claims. (Cl. 192—.01)

This invention relates to automotive vehicle control mechanism, and more particularly to power actuation thereof and control means therefor.

It has heretofore been proposed to employ in connection with automotive vehicles various types of power actuators for operating the brakes and clutch and other controls, which are usually manually operated. As a general rule, considerable effort is usually required for manual operation of these controls, and hence it is highly desirable, in order to dispense with such manual effort, that these controls be power actuated by "boosters" or servo-motor devices. A particular use for these devices is in the actuation of the clutch, for if the clutch be power actuated it immediately becomes adapted for control by the motor vehicle engine throttle, the throttle control thus serving also as a clutch control and being so arranged that upon or after closing of the throttle the clutch will be disengaged. Such an arrangement results in "free wheeling" and other advantages, such as economy and ease of operation. Whereas fluid motors with control valves therefor operated by the throttle control have heretofore been utilized principally for this purpose, this invention contemplates the use of a novel power actuator rotatable by an engine driven shaft for controlling the engagement and disengagement of the clutch or other vehicle control device.

It is accordingly one of the objects of this invention to provide a novel and improved power actuating mechanism for controls of motor vehicles and the like.

Another object of the present invention is to provide a novel booster or servo-motor apparatus for automotive vehicle controls whereby the controls may be actuated by light manual effort, the booster supplying the energy required for operating the control.

Still another object is to provide a novel mechanism whereby power may be taken from a rotating shaft and utilized for the purpose of easing the operation of laborious or stiff operating manual controls.

A further object is to provide novel mechanism employing friction clutch means in connection with a manual control and a source of power wherein operation of the control serves to operate the friction clutch means for power operation of the control.

A still further object is to provide a novel power actuated clutch control for automotive vehicles, which may readily be utilized in conjunction with other controls for automatic clutch operation.

A still further object is to provide a power booster of comparatively simple construction and readily adaptable to the present day automotive vehicle.

Other novel features and advantages of the invention will appear more fully hereinafter from the following detailed description when taken in connection with the accompanying drawing illustrating one form of the invention. It is expressly understood, however, that the drawing is for purposes of illustration only and is not designed as a definition of the limits of the invention, reference being had for this purpose to the appended claims.

In the drawing, the single figure illustrates a diagrammatic showing of one form of the invention.

Referring to the drawing, the present invention is diagrammatically shown therein as embodying in an internal combustion engine a clutch pedal, throttle control pedal or accelerator, and carburetor, as found in the standard automotive vehicle, together with a power booster and suitable linkage therefor. The usual accelerator pedal 1, pivoted about pin 2 is, as shown, connected by suitable links 3 and 4 and a bell crank 5 interposed therebetween, to a throttle valve 6 of the carburetor 7. A spring 8 serves to normally maintain the throttle valve in closed position.

To provide for automatic clutch control from the accelerator pedal, a suitable linkage is provided comprising links 9 and 10, bell cranks 11, 12 and 13, and a flexible cable or band 14, which cable or band is secured to the clutch pedal 15. A spring 22, positioned between the bell crank 11 and a suitable stationary support, maintains the linkage normally in tension.

A power driven member or drum 16 is provided which is, in operation, constantly rotated by the source of motive power of the vehicle. As may be seen, the flexible cable 14, which may be in the form of a cord or strap, passes over guide pulleys 18 and 19 and is wrapped about the drum in a direction such that upon frictional engagement of the band with the drum, the flexible cable will be moved to the right, exerting a pull on the clutch pedal 15 against the usual clutch return spring 23 to effect disengagement of the clutch.

To provide a certain amount of resiliency in the system, a spring 17 may be provided in the flexible cable 14 as shown. A stop 20 adapted to engage a fixed abutment 21 is also provided, for a purpose which will appear hereinafter.

In operation of the clutch control, it will be apparent that in the position shown, the accelerator pedal is in normal or closed throttle position and that, as a result thereof, the flexible link 14 has been drawn taut about the rotating friction drum 16, thus causing a wrapping or reeling action and movement of the flexible cable to the right, thereby actuating the clutch pedal to disengaged position. It will be observed that, should the accelerator pedal be now actuated to open the throttle, the linkage would move the bell crank lever 13 to the position 13' shown in dotted lines, thereupon loosening the band about the drum, whereby the stop 20 would engage the abutment 21 and further movement of the bell crank 13 would merely slacken the wrap about the drum and further reduce the frictional engagement of the band therewith to a minimum. Upon the engagement of the stop 20 with the abutment 21, the clutch pedal will assume the engaged position 15', and further movement of the accelerator pedal to open throttle position will merely increase the slack in the portion of the flexible cable located between the abutment 21 and bell crank 13, thereby further reducing any slight residual frictional engagement with the drum 16.

It will be readily observed that the clutch pedal may take any intermediate position provided the accelerator pedal is moved the corresponding amount, since the friction drum actuates the clutch pedal only so long as the accelerator pedal maintains the flexible cable in frictional engagement with the drum, it further being pointed out in this connection that the drum actuates the clutch pedal only a certain amount, predetermined by the movement of the accelerator, since further movement of the clutch pedal by the drum tends to loosen the wrap around the drum and reduce the frictional engagement therebetween.

There is thus provided by the present invention a novel control mechanism readily adapted to clutch control, or in fact to any control which may require a booster or servo-motor for operation thereof, which mechanism is simple, efficient, and readily adapted to an automotive vehicle. Since only a slight force need be applied to the accelerator pedal, merely sufficient to tighten the flexible cable or band about the power drum, whereupon the drum actuates the clutch pedal against its return spring, it will be seen that the association of parts are readily adaptable for booster operation upon any control, as for example, braking.

While one embodiment of the invention has been shown and described herein, it is to be expressly understood that the same is not limited thereto but may be embodied in other forms, as well understood by those skilled in the art. Reference will, therefore, be had to the appended claims for a definition of the limits of the invention.

What is claimed is:

1. A clutch control for an automotive vehicle comprising throttle control means, a clutch control member, a friction member having power means for rotating the same in one direction, and a flexible cable connected between said throttle control means and said clutch control member and having a wrap around said friction member for frictional engagement therewith.

2. A power actuator for an automotive vehicle control member comprising a rotating friction member, a cable connected to said vehicle control member and having a normally loose wrap around said friction member, a vehicle speed controlling device, and means operable with the device for tightening said wrap about said rotating member to produce frictional engagement therebetween, thereby actuating said control member.

3. In an automotive vehicle having an engine and a control therefor, a rotating drum, a cable having a wrap about said drum, means operable with the engine control for tightening said wrap about said drum to cause frictional engagement therewith, and control means connected with said cable, said control means being operated by the winding action of the cable on the drum.

4. A power actuator for an automotive vehicle clutch control member comprising a rotating friction drum, a throttle control member, and a linkage between said throttle control member and said clutch control member, a portion of said linkage being adapted for frictional engagement with said drum upon tension being applied to said linkage.

5. In an automotive vehicle having an engine, a rotating friction drum, a clutch having actuating mechanism, an engine speed control member, linkage connecting said control member with said clutch actuating mechanism, said linkage including means for operating said actuating mechanism by frictional engagement with said rotating drum upon a tensioning of said linkage through movement of said control member.

6. In an automotive vehicle having an engine and a speed control therefor, a clutch, linkage for actuating said clutch, a rotating member, said linkage including means to engage said member whereby, upon tensioning of said linkage, said clutch is power-actuated by said rotating member, and means for controlling the tensioning of the linkage by the engine speed control.

7. In an automotive vehicle having a clutch, a clutch lever for disengaging and engaging the clutch, a throttle, control means therefor, a motor driven friction drum, and a linkage between said control means and said clutch lever, said linkage having means for engaging said drum upon tensioning of said linkage whereby rotation of the drum will power-actuate said clutch lever as long as the tension in said linkage is maintained.

8. In an automotive vehicle comprising a clutch actuating lever, a throttle control lever having open and closed positions and linkage connected therebetween, a power drum, said linkage having a wrap about said drum and adapted to frictionally engage said drum to actuate said lever when said throttle control lever is in closed position.

9. In an automotive vehicle control booster an engine, a rotary power friction drum, linkage connected between a member adapted for power actuation and a control member for the engine, said linkage adapted to engage said drum and to be reeled thereby upon a tensioning thereof.

10. In an automotive vehicle control booster an engine, a rotary power friction drum, linkage connected between a member adapted for power actuation and a control member for the engine, said linkage adapted to engage said drum and to be reeled thereby upon a tensioning thereof, said tensioning being produced by movement of said control member.

11. In combination with an internal combustion engine having a rotating member driven thereby, a clutch operating element, an engine speed control member, and a tension means frictionally contacting said rotating member and connected to said element to effect clutch-disengaging movement of the latter, said last named means being controlled by said engine control member in a manner to increase the frictional contact after the member has moved a predetermined distance toward a decreased engine speed position.

12. In combination with an internal combustion engine having a throttle valve and a rotating member, a control for the throttle valve, a control operating element, manual means for operating said control, said manual means effecting driving engagement between said rotating member and said operating element upon actuation thereof.

13. In an automotive vehicle, an engine, a member directly connected to said engine for rotation therewith, a clutch operating element, an engine speed control member, and tension means frictionally looped around said rotating member and connected to said element to effect clutch-disengaging movement of the latter, said last named means being controlled by said engine control member in a manner to increase the tension after a predetermined movement toward a decreased engine speed position.

14. In engine driven vehicle control, a clutch operating lever, a drum rotated by the engine, an engine throttle control, a cable having one end connected to the lever and its intermediate portion wrapped around the drum, means connected to the other end of the cable for tensioning the cable, and said means including a lever adjacent the throttle control arranged to be operated by the control in a manner to tension the cable when the throttle is closed.

15. In engine driven vehicle control, a clutch operating lever, a drum rotated by the engine, an engine throttle control, a cable having one end connected to the lever and its intermediate portion wrapped around the drum, means connected to the other end of the cable for tensioning the cable, said means including a lever adjacent the throttle control arranged to be operated by the control in a manner to tension the cable when the throttle is closed, and resilient means for relieving the tension of the cable when the throttle is moved to open position.

RAYMOND P. LANSING.